E. A. NEAL.
RAKE CLEANER.
APPLICATION FILED JAN. 20, 1914.
1,168,100.
Patented Jan. 11, 1916.
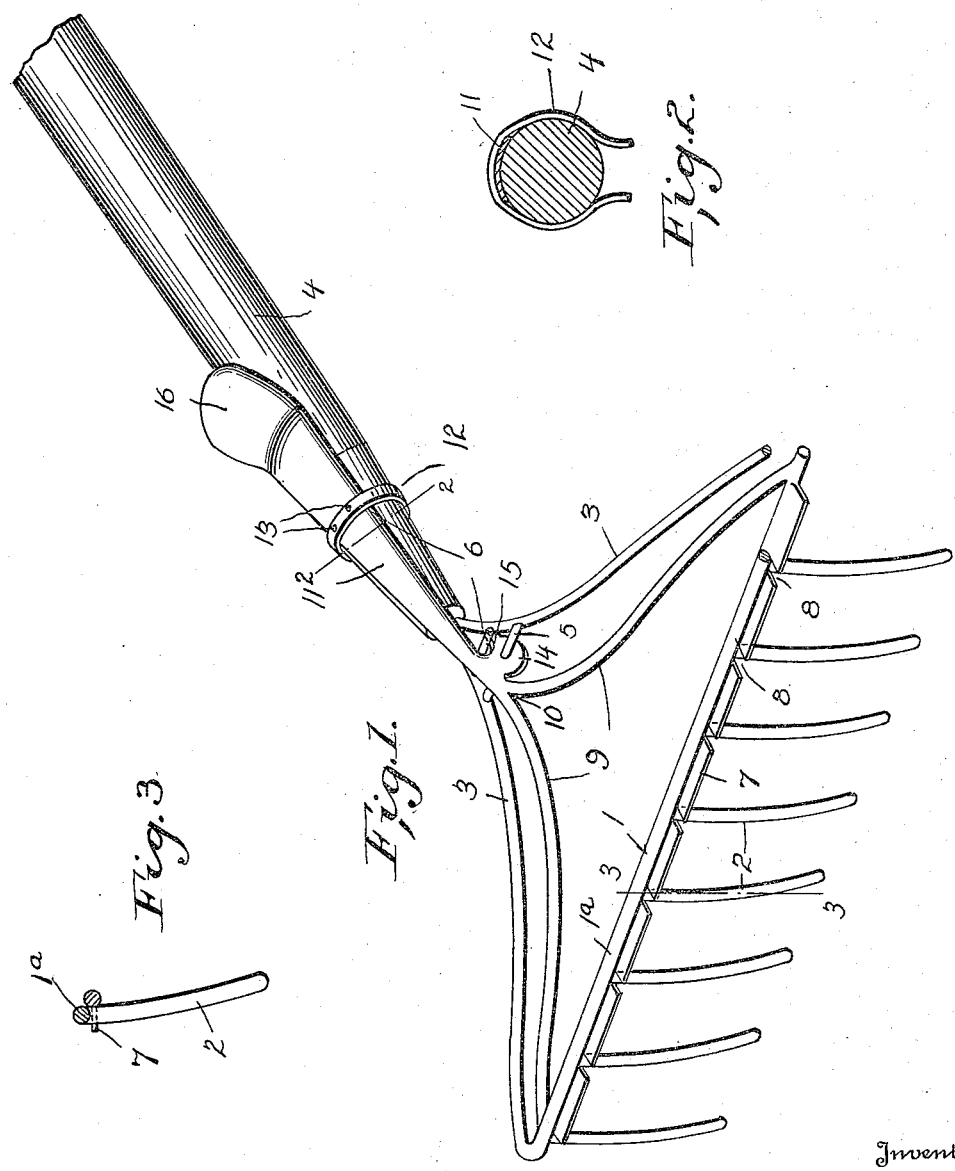

UNITED STATES PATENT OFFICE.

EVERETT A. NEAL, OF MUNCIE, INDIANA.

RAKE-CLEANER.

1,168,100.  Specification of Letters Patent.  Patented Jan. 11, 1916.

Application filed January 20, 1914. Serial No. 813,230.

*To all whom it may concern:*

Be it known that I, EVERETT A. NEAL, a citizen of the United States, residing at Muncie, in the county of Delaware and State of Indiana, have invented certain new and useful Improvements in Rake-Cleaners; and I do hereby declare the following to be a full, clear, and exact description of the invention, such as will enable others skilled in the art to which it appertains to make and use the same.

This invention relates to rake cleaners, and one of the principal objects of the same is to provide a device of simple construction to be pivotally connected to a rake and which can be quickly operated for cleaning the teeth.

Another object of the invention is to provide a rake cleaner to be pivoted to the rake head and to be provided with a spring for holding the cleaner in its uppermost position and the upper portion of the cleaner being curved upwardly to permit the thumb of the user to be inserted for operating the cleaner.

These and other objects may be attained by means of the construction illustrated in the accompanying drawing, in which, Figure 1 is a perspective view of a rake having a cleaner connected thereto and made in accordance with this invention. Fig. 2 is a sectional view taken on the line 2—2 of Fig. 1. Fig. 3 is a sectional view taken on the line 3—3 of Fig. 1.

Referring to the drawing, the numeral 1 designates a rake of the usual or any suitable type, and comprising a bar provided with a series of teeth 2 and converging members 3 inserted in the lower end of the handle 4. Extending across between the members 3 near their upper ends is a pivot pin 5 and spaced a slight distance from said pin is a stop 6.

The cleaner comprises a bar or plate 7, having a series of notches 8 in the front edge thereof through which the teeth 2 of the rake extend. The bar 7 is disposed underneath the cross-bar 1ᵃ of the rake. Converging members 9 are connected to the outer ends of the rake cleaner bar 7 and are united at 10 with the operating lever 11, the latter being slightly curved to fit against the lower portion of the handle 4. A spring 12 connected to the lever 11 at 13 partially surrounds the handle 4 and serves to hold the lever down to the handle and the bar 7 up against the cross-bar 1ᵃ of the rake. The cleaner is provided with a lug 14, through which the pivot pin 5 extends, and said lug 14 is recessed at 15 for the stop 6. The upper end of the lever 11 is curved upwardly away from the handle 4 as shown at 16.

In operation, the thumb of the operator is inserted underneath the curved portion 16 to shove the bar 7 down and clean the teeth on the pivotal point 5. The stop 6 coming in contact with the lower portion of the wall of the recess 15 serves to limit the outward movement of the bar 7 beyond the ends of the teeth 2. When the thumb is withdrawn, the spring 12 carries the bar 7 back to its original position.

From the foregoing it will be obvious that a rake cleaner made in accordance with this invention can be manufactured at low cost, is reliable and efficient for its purpose and can be readily connected to any rake.

Various changes in details of construction may be resorted to without departing from the spirit and scope of the invention as defined in the claim.

What is claimed is:—

In a device of the character described including a rake, said rake comprising a handle, a head, teeth carried by the head, a pair of converging bars formed at the ends of the head and connected to the handle at their converging point, a pin extending transversely of the converging bars, a stripping bar adapted to engage said teeth, a pair of converging members formed at the ends of the stripping bar, a lug secured to said converging members at their converging point, said lug having an aperture, said pin extending through said aperture, whereby the stripping bar is pivoted to the converging bars of the rake, a stop bar secured to the converging bars intermediate the said pin and rake handle, a curved extension on said lug, said extension being adapted to engage said stop bar, whereby the downward movement of the stripping bar is limited, a lever secured to said lug and extending rearwardly to lie on the rake handle, a spring clasp secured to said lever and adapted to engage the rake handle, whereby the lever is normally held against the rake handle.

In testimony whereof I affix my signature in presence of two witnesses.

EVERETT A. NEAL.

Witnesses:
J. E. KENDALL,
FRED M. GRIFFITH.

Copies of this patent may be obtained for five cents each, by addressing the "Commissioner of Patents, Washington, D. C."